United States Patent Office 2,756,234
Patented July 24, 1956

2,756,234

ANTHRAPYRIDONES

Edward F. Elslager, Harper Woods, Mich., assignor to Parke, Davis & Company, Detroit, Mich., a corporation of Michigan No Drawing. Application December 2, 1953,
Serial No. 395,833

11 Claims. (Cl. 260—278)

This invention relates to a class of new isoquinoline compounds and to a process for producing the same. More particularly, the invention relates to isoquinoline compounds having the formula,

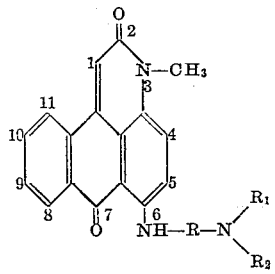

and acid addition salts thereof; where R is a divalent alkyl group containing from 2 to 5 carbon atoms, $R_1$ is hydrogen or an alkyl or hydroxyalkyl radical containing not more than 2 carbon atoms and $R_2$ is a hydroxyethyl or alkyl radical containing from 2 to 8 carbon atoms, or taken together with $R_1$ and —N< represents a piperidino, morpholino or pyrrolidino group.

The compounds of the invention possess useful chemotherapeutic properties, especially as amebacidal agents being particularly effective in combatting E. histolytica.

The new compounds may be employed in the form of the free base having the above formula or the addition salt of an oganic or inorganic acid. One of the preferred isoquinoline compounds of the invention is 6-(γ-diethylaminopropylamino) - 3 - methyl-7H-dibenz[f,i j]isoquinoline - 2,7(3H)-dione or the acid addition salt thereof. In general, acid addition salts of any relatively non-toxic organic or inorganic acid are suitable. Some typical examples of these salts are the hydrochloride, hydrobromide, sulfate, phosphate, oxalate, sulfamate, sulfonate, acetate, lactate, tartrate, gluconate, citrate, salicylate (especially 5,5'-methylene disalicylate), benzoate, pamoate, cresotinate (especially methylene-di-o-cresotinate) naphthoate (especially 3-hydroxy-2-naphthoate), and the like. One of the preferred sulfonic acid salts is the salt of 8-hydroxy-7-iodo-5-quinoline sulfonic acid. This salt has the advantage in that the acid moiety itself possesses amebacidal properties.

Other preferred salts of the isoquinoline compounds are the penicillinates (especially the benzyl penicillinates); these penicillinate salts are advantageous in that they possess both amebacidal and antibacterial properties.

In accordance with the invention the above isoquinoline compounds are produced by condensing a 6-halo-3-methyl - 7H - dibenz[f,i j]isoquinoline - 2,7(3H) - dione having the formula,

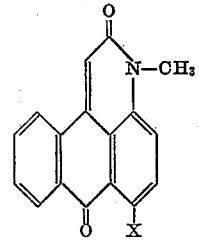

with an alkylaminoalkylamine having the formula,

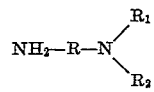

where X is a halogen atom such as a bromine or chlorine atom and R, $R_1$ and $R_2$ have the aforementioned significance.

In carrying out the condensation it will usually be satisfactory to employ substantially equivalent quantities of the reactants in conjunction with an organic solvent such as pyridine, benzene, toluene, xylene, dioxane, petroleum ether and the like. If desired an excess of either of the reactants may be employed, but it is preferable to employ the amine in excess since it serves in most cases as a particularly useful solvent. The temperature of the reaction can be varied considerably and is not particularly critical. In general, the reaction is favored by temperatures in excess of 75° C. Preferably the reaction is carried out in the range from about 105° C. to the reflux temperature of the particular amine employed. If desired, the reaction may be carried out in the presence of a condensation catalyst such as the copper salts, copper dust and the like. For example, cuprous chloride can be advantageously employed as a catalyst.

The invention is illustrated by the following examples.

Example 1

A mixture of 20 g. of 6-bromo-3-methyl-7H-dibenz-[f, i j]isoquinoline-2,7(3H)-dione, 25 g. of β-diethylaminoethylamine, and a trace of cuprous chloride as catalyst is heated at 140° C. for six hours. Upon cooling, the mixture is poured into a 3-l. three-neck flask together with 100 cc. of 2 N sodium hydroxide and steam distilled for two hours. The mixture is cooled, the alkaline solution is decanted, and the dark red gum which remains is extracted with 10% acetic acid by warming on the steam bath. The red acid extract is heated with decolorizing charcoal, filtered, and the filtrate made strongly alkaline with 20% sodium hydroxide solution. The dark red gum which separates is crystallized from benzene. The red crystalline product, 6-(β-diethylaminoethylamino) - 3 - methyl - 7H - dibenz[f, i j]isoquinoline-2,7(3H)-dione has a melting point of 194–196° C. The formula of the product is,

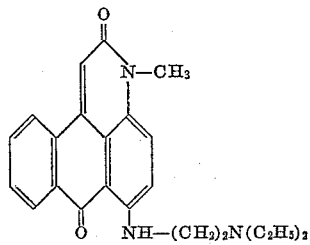

Example 2

A mixture of 100 g. of 6-bromo-3-methyl-7H-dibenz-[f,i j]isoquinoline - 2,7(3H) - dione, 200 g. of γ-diethylaminopropylamine, and a trace of cuprous chloride as catalyst is stirred and refluxed for fifteen hours. Upon cooling, the dark red mixture is poured into a 5 l. three-neck flask together with 600 cc. of 2 N sodium hydroxide solution, and the mixture is steam-distilled for two hours. The mixture is cooled and the alkaline solution is decanted, leaving a dark red gum wich is extracted with hot 10% acetic acid. The red acid extract is heated with decolorizing charcoal, filtered, and the red filtrate made strongly alkaline with 20% sodium hydroxide solution. Crystallization of the dark red gum which separates from acetone yields a red crystalline product, 6-(γ-diethylaminopropylamino) - 3 - methyl - 7H - dibenz[f,i j]isoquinoline - 2,7(3H) - dione. This product melts at 175–176° C. and has the formula,

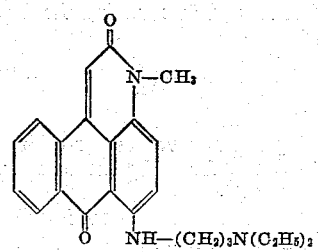

Example 3

A mixture of 34 g. of 6-bromo-3-methyl-7H-dibenz-[f,ij]isoquinoline-2,7(3H)-dione, 34 g. of ε-(1-piperidino)amylamine, and 60 g. of dry pyridine is refluxed for eighteen hours. The mixture is cooled, the residue is poured into a 5-l. three-neck flask, 200 cc. of 2 N sodium hydroxide is added, and the mixture is steam distilled for three hours. The residue is cooled, the alkaline solution is decanted, and the dark red gummy residue is extracted with 10% acetic acid. The deep red acid extract is treated with decolorizing charcoal, filtered, and is made strongly alkaline with 20% sodium hydroxide solution. A dark red gum separates, which slowly solidifies. Recrystallization of this residue from acetone gives orange-red crystals which soften at 178° C., and melt at 183–185° C. This product, 6-[ε-(1-piperidino)amylamino]-3-methyl - 7H - dibenz[f,ij]isoquinoline-2,7(3H)-dione, has the formula,

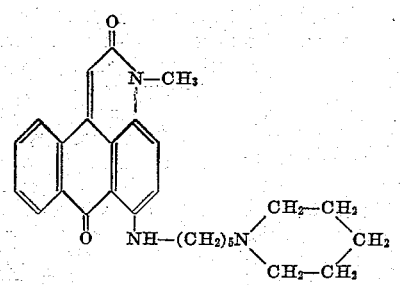

Example 4

A mixture of 50 g. of 6-bromo-3-methyl-7-dibenz[f,ij]-isoquinoline-2,7-(3H)-dione, 100 g. of γ-isopropylaminopropylamine, and a trace of cuprous chloride as catalyst is stirred and heated at 115–120° C. for sixteen hours. The mixture is cooled and poured into a 5-l. three-neck flask together with 300 cc. of 2 N sodium hydroxide. The mixture is steam-distilled for four hours, the residue is cooled, and the alkaline solution decanted from the gummy red solid. The gum is extracted with warm 10% acetic acid, the extract is treated with decolorizing charcoal, filtered, and the red filtrate is made strongly alkaline with 20% sodium hydroxide solution. A dark red gum is obtained, which upon recrystallization from benzene gives the desired 6-(γ-isopropylaminopropylamino)-3-methyl - 7H - dibenz[f,ij]-isoquinoline-2,7(3H)-dione, of formula,

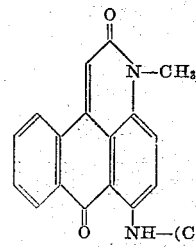

This product exists as orange-red crystals which soften at 153° C., and melt at 157–158° C. The dihydrochloride salt is obtained by dissolving the product in benzene and treating with an excess of dry hydrogen chloride.

Example 5

A mixture of 50 g. of 6-bromo-3-methyl-7-dibenz[f,ij]-isoquinoline-2,7(3H)-dione, 100 g. of γ-(4-morpholino)-propylamine, and a trace of cuprous chloride as catalyst is heated and stirred at 105–110° C. for sixteen hours. Upon cooling, the mixture is poured into a 5-l. three-neck flask together with 300 cc. of 2 N sodium hydroxide and steam distilled for four hours. The mixture is cooled, the alkaline solution is decanted, and the residual dark red gum is extracted with warm 10% acetic acid. The warm acid extract is treated with decolorizing charcoal, filtered, and the filtrate made strongly alkaline with 20% sodium hydroxide solution. The dark red gum which separates is washed with water and recrystallized from benzene in the form of glistening orange-red crystals, M. P. 203.5–204.5° C. This product, 3-methyl-6-[γ-(4-morpholino)-propylamino]-7H-dibenz[f,ij]isoquinoline - 2,7 - (3H)-dione, has the formula,

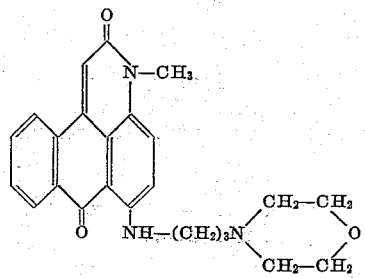

Example 6

A mixture of 20 g. of 6-bromo-3-methyl-7H-dibenz-[f,ij]isoquinoline-2,7(3H)-dione, 20 g. of γ-bis(β-hydroxyethyl)aminopropylamine, and a trace of cuprous chloride as catalyst is stirred and heated at 180° C. for six hours. The reaction mixture is cooled to 80° C., 200 cc. of water is added, and the oily residue is poured into 200 cc. of 2 N sodium hydroxide solution. The alkaline solution is decanted, the dark red gum is washed with water, and extracted with warm 10% acetic acid. The red acid extract is heated with decolorizing charcoal, filtered, and the filtrate made strongly alkaline with 20% sodium hydroxide solution. The dark red hygroscopic gum which separates is dissolved in ethanol, and the desired 6-[γ-bis(β - hydroxyethyl)aminopropylamino]-3-methyl-7H-dibenz[f,ij]isoquinoline-2,7(3H)-dione, of formula,

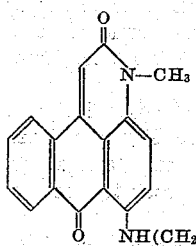

is precipitated as the phosphoric acid salt by the addition of phosphoric acid.

Example 7

A mixture of 20 g. of 6-bromo-3-methyl-7H-dibenz-[f,ij]isoquinoline-2,7(3H)-dione, 13 g. of β-(β-hydroxyethylamino)ethylamine, and a trace of cuprous chloride as catalyst is stirred and heated at 150° C. for twelve hours. Upon cooling, the dark red mixture is poured into a three-neck flask together with 200 cc. of 2 N sodium hydroxide solution, and the mixture is steam distilled for three hours. The mixture is cooled, the alkaline solution is decanted, and the dark red gum is extracted with warm 10% acetic acid. The red acid extract is heated with decolorizing charcoal, filtered, and the red filtrate made strongly alkaline with 20% sodium hydroxide solution. The dark red hydroscopic gum which separates is dissolved in ethanol, and the desired 6-[β-(β-hydroxyethylamino)ethylamino] - 3 - methyl-7H-dibenz[f,ij]isoquinoline-2,7(3H)-dione, of formula,

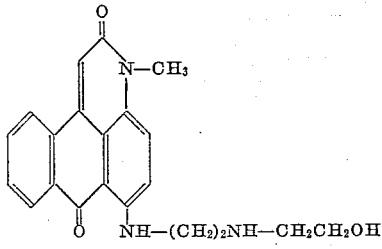

is precipitated as the phosphoric acid salt by the addition of phosphoric acid.

Example 8

A mixture of 20 g. of 6-chloro-3-methyl-7H-dibenz-[f,ij]isoquinoline-2,7(3H)-dione, 25 g. of ε-(ethyl-β-hydroxyethylamino)amylamine, and a trace of cuprous chloride is stirred and heated at 150° C. for twelve hours. Upon cooling, the dark red mixture is poured into a three-neck flask together with 200 cc. of 2 N sodium hydroxide solution, and the mixture is steam distilled for three hours. The mixture is cooled, the alkaline solution is decanted, and the dark red gum is extracted with warm 10% acetic acid. The red acid extract is heated with decolorizing charcoal, filtered, and the red filtrate made strongly alkaline with 20% sodium hydroxide solution. The dark red hygroscopic gum which separates is dissolved in ethanol, and the desired 6-[ε-(ethyl-β-hydroxyethylamino)amylamino] - 3 - methyl - 7H - dibenz-[f,ij]isoquinoline-2,7(3H)-dione of formula,

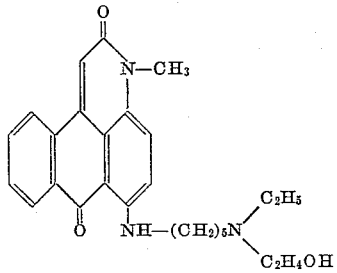

is precipitated as the phosphoric acid salt by the addition of phosphoric acid.

Example 9

A mixture of 34 g. of 6-bromo-3-methyl-7H-dibenz[f,ij]isoquinoline-2,7(3H)-dione, 23 g. of β-(1-pyrrolidino)-ethylamine, and 60 g. of dry pyridine is refluxed for eighteen hours. The mixture is cooled, the residue is poured into a 5 l. three-neck flask, 200 cc. of 2 N sodium hydroxide is added, and the mixture is steam distilled for three hours. The residue is cooled, the alkaline solution is decanted, and the dark red residue is extracted with 10% acetic acid. The acid extract is treated with decolorizing charcoal, filtered, and is made strongly alkaline with 20% sodium hydroxide solution. A red gum separates and is isolated and allowed to solidify. The product is obtained in pure form by recrystallizing this solid residue from acetone. The product, 3-methyl-6-[β-(1-pyrrolidino)ethylamino]-7H-dibenz[f,ij]-isoquinoline-2,7(3H)-dione, has the formula,

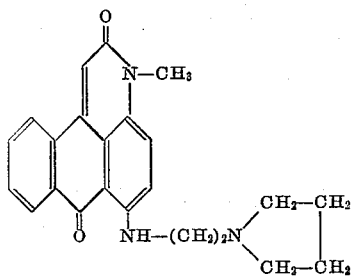

Example 10

A mixture of 50 g. of 6-bromo-3-methyl-7-dibenz[f,ij]isoquinoline-2,7(3H)-dione, 56 g. of γ-octylaminopropylamine, and a trace of cuprous chloride is stirred and heated at 115–120° C. for sixteen hours. The mixture is cooled and poured into a three-neck flask together with 300 cc. of 2 N sodium hydroxide. The mixture is steam-distilled for four hours, the residue is cooled and the alkaline solution decanted from the residual solid. The residue is extracted with warm 10% acetic acid and the extract is treated with decolorizing charcoal and filtered. The filtrate is made strongly alkaline with 20% sodium hydroxide solution and allowed to stand for the separation of the desired product, 6 - (γ - octylaminopropylamino) - 3 - methyl - 7H - dibenz[f,ij]-isoquinoline-2,7(3H)-dione, of formula,

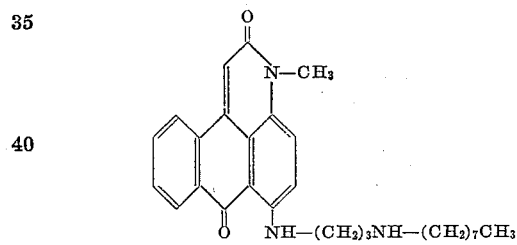

The product can be purified if desired by recrystallization from benzene.

Example 11

A mixture of 20 g. of 6-bromo-3-methyl-7H-dibenz-[f,ij]isoquinoline-2,7(3H)-dione, 20 g. of δ-diethylamino-α-methylbutylamine and a trace of cuprous chloride as catalyst is stirred and heated at 150° C. for twelve hours. Upon cooling, 200 cc. of 2 N sodium hydroxide are added to the reaction mixture, and the mixture is steam distilled for three hours. The mixture is cooled, the alkaline solution is decanted, and the dark red gum is extracted with warm 10% acetic acid. The red acid extract is heated with decolorizing charcoal, filtered, and the red filtrate made strongly alkaline with 20% sodium hydroxide solution. The product which separates is washed with water and recrystallized from benzene. The product, 3-methyl-6-[δ-diethylamino-α-methylbutylamino] - 7H - dibenz[f,ij]isoquinoline - 2,7 - (3H)-dione, has the formula,

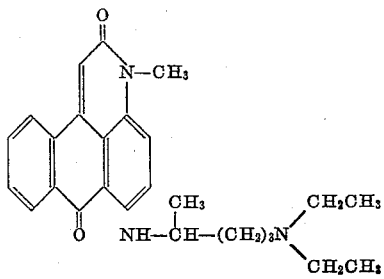

The product is obtained as the dihydrochloride salt by treating an ethanolic solution of the product with an excess of dry hydrogen chloride.

Example 12

A solution of 4.25 g. of 6-(γ-diethylaminopropylamino) - 3 - methyl - 7H - dibenz[f,ij]isoquinoline - 2,7(3H)-dione, hydrochloride, in 10 cc. of water is slowly added at 60° C. with mechanical stirring to a solution of 4.0 g. of sodium 8-hydroxy-7-iodo-5-quinoline sulfonate in 25 cc. of water. The product, a solid crystalline salt, separates and is recrystallized from ethanol. The product 6 - (γ-diethylaminopropylamino) - 3 - methyl - 7H - dibenz[f,ij]isoquinoline - 2,7(3H) - dione, 7 - iodo - 8-hydroxyquinoline-5-sulfonate, has the formula,

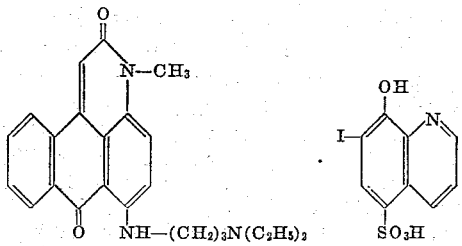

Example 13

A mixture of 50 g. of 6-bromo-3-methyl-7H-dibenz[f,ij]isoquinoline-2,7(3H)-dione, 56 g. of γ-(α-methylheptylamino)propylamine and a trace of cuprous chloride is stirred and heated at 115–120° C. for sixteen hours. The mixture is cooled and poured into a three-neck flask together with 300 cc. of 2 N sodium hydroxide. The mixture is steam-distilled for four hours, the residue is cooled and the alkaline solution decanted from the residual solid. The residue is extracted with warm 10% acetic acid and the extract is treated with decolorizing charcoal and filtered. The filtrate is made strongly alkaline with 20% sodium hydroxide solution and allowed to stand for the separation of the desired product, 6-[γ-(α-methylheptylamino)propylamino]3 - methyl - 7H - dibenz[f,ij]isoquinoline-2,7(3H)-dione, of formula,

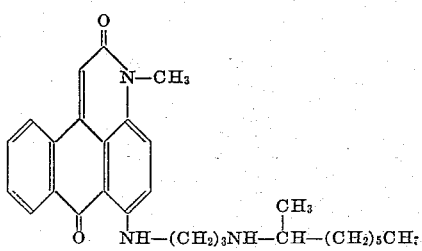

The dihydrochloride salt is obtained by dissolving the product in benzene and treating with an excess of dry hydrogen chloride.

γ-(α-Methylheptylamino)propylamine, used in the preparation of the above isoquinoline compound, can be prepared in the following manner: trimethylene diamine (59.2 grams) is stirred and heated to 45° C. Heating is then stopped and 38.6 g. of β-bromooctane is added slowly over a period of about 20 minutes during which the temperature rises to about 100° C. Heating is then continued at 100–145° C. for one and one-half hours. The cooled mixture is transferred to a separatory funnel, the upper layer is treated with 250 ml. of water, the mixture is extracted with ether, and the ether extract is washed thoroughly with water and dried over anhydrous sodium sulfate. Removal of the solvent from the dried ether solution yields the desired γ-(α-methylheptylamino)propylamine as a low melting, white, waxy solid.

Example 14

A filtered solution of 3.72 g. of potassium benzyl penicillin in 10 cc. of water is slowly added to a solution of 4.12 g. of 6-(γ-isopropylaminopropylamino)-3-methyl-7H-dibenz[f,ij]isoquinoline-2,7(3H)-dione hydrochloride in 5 cc. of water at room temperature with stirring. The red oil which separates is triturated with several portions of ether, and by vigorous scratching, the product solidifies. The product, 6-(γ-isopropylaminopropylamino)-3-methyl-7H-dibenz[f,ij]isoquinoline-2,7(3H)-dione, benzyl penicillinate is purified by recrystallizing from an ethanol-ether mixture. The product has the formula,

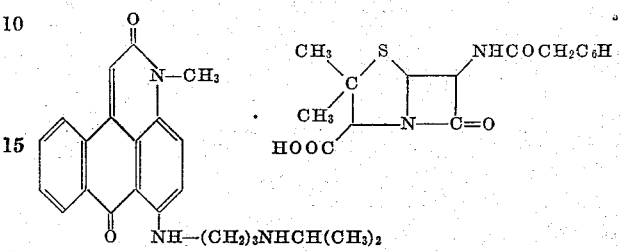

The 6-halo-3-methyl-7H-dibenz[f,ij]isoquinoline-2,7-(3H)-dione compounds used as starting materials in the practice of the invention are known compounds. The hydroxyalkylaminoalkylamines can be prepared by reacting an N-(bromoalkyl) phthalimide with a hydroxyalkylamine and subjecting the resulting product to acid hydrolysis.

The preparation of the hydroxyalkylaminoalkylamine compounds is illustrated by the following specific example.

ε-(Ethyl-β-hydroxyethylamino)amylamine.—A mixture of 480 g. of monoethylethanolamine, 220 g. of N-(ε-bromoamyl) phthalimide and 2 l. of xylene is refluxed for 18 hours. Upon cooling, one mole of potassium carbonate is added with stirring and the xylene and excess amine are removed in vacuo. The residue is extracted with methylene chloride, and the methylene chloride is removed in vacuo from the extract leaving N-[ε-(ethyl-β-hydroxyethylamino)amyl]phthalimide as a viscous oil. The oil is hydrolyzed by refluxing with 400 cc. of 20% hydrochloric acid for 4 hours. Upon cooling, phthalic acid separates and is collected by filtration. Neutralization of the filtrate with a saturated potassium hydroxide solution at 10° C. cause the free amine to separate as an oil. The oil is separated from the alkaline solution, and is repeatedly dried over solid potassium hydroxide. Distillation of the oil in vacuo gives ε-(ethyl-β-hydroxyethylamino) amylamine; B. P. 103–105° C. at 1.5 mm., $N_D^{25}$ 1.4870.

In accordance with the invention, the new 6-aminoalkylamino - 3 - methyl - 7H - dibenz[f,ij]isoquinoline - 2,7(3H)-dione compounds can be converted from the acid addition salt form to the free base form by dissolving the compounds in a suitable solvent such as water and neutralizing the solution with an organic or inorganic base such as sodium hydroxide, ammonium hydroxide, sodium carbonate, potassium carbonate, tertiary organic amines and the like. In some instances it will be desirable to obtain the acid addition salt from the free base. The salt can be prepared by reaction of the free base with the corresponding organic or inorganic acid in a suitable solvent. The following specific example serves as an illustration of the method of converting the addition salt of hydrochloric acid to the free base and then converting the free base to the addition salt of a different acid.

0.5 g. of 6-(γ-diethylaminopropylamino)-3-methyl-7H-dibenz[f,ij]isoquinoline-2,7(3H)-dione, dihydrochloride, is shaken with 1 ml. of concentrated ammonium hydroxide in 9 ml. of water. The free base, 6-(γ-diethylaminopropylamino) - 3 - methyl - 7H - dibenz[f,ij]isoquinoline - 2,7(3H)-dione, separates out and is isolated and extracted with ether. The ether extract is washed with water and dried over anhydrous potassium carbonate. If desired, the free base can be isolated in pure form by filtering off the potassium carbonate and removing the ether in vacuo. Upon addition of an alcoholic solution of citric acid to the ether solution of the free base the red citric acid salt of 6-(γ-diethylaminopropylamino)-3-methyl-7H-dibenz[f,ij]isoquinoline-2,7-(3H)-dione precipitates out. This compound is recovered in pure form by filtering and recrystallizing the precipitate from alcohol.

What I claim is:

1. A compound of the class consisting of a free base and its acid addition salts, said free base having the formula,

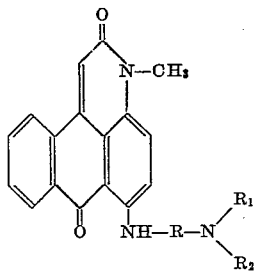

where R is a divalent alkyl group containing from 2 to 5 carbon atoms, R₁ is a member of the group consisting of hydrogen and alkyl and hydroxyalkyl radicals containing not more than two carbon atoms and R₂ is a member of the group consisting of alkyl and hydroxyalkyl radicals containing from two to eight carbon atoms and further members wherein R₁ and R₂ taken together with —N< represent a radical of the class consisting of piperidino, morpholino and pyrrolidino radicals.

2. A compound having the formula,

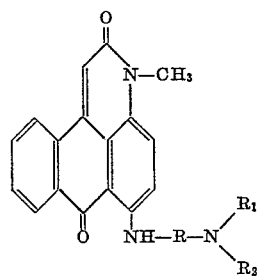

3. An acid addition salt of a compound having the formula,

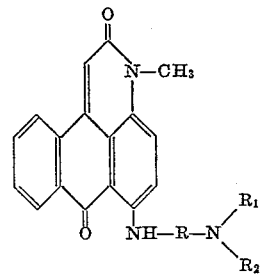

where R, R₁ and R₂ are lower alkyl.

4. An acid addition salt of a compound having the formula,

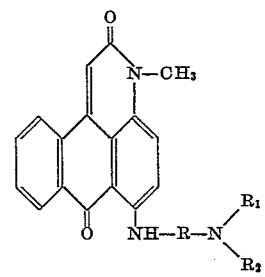

where R is alkyl and R₁ and R₂ taken together with —N< represent a piperidino radical.

5. An acid addition salt of a compound having the formula,

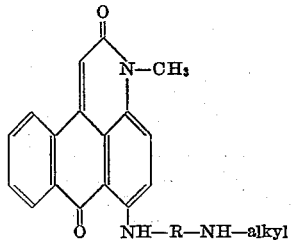

where R is a divalent alkyl group containing from 2 to 5 carbon atoms and said alkyl is an alkyl radical containing from two to eight carbon atoms.

6. An acid addition salt of a compound having the formula,

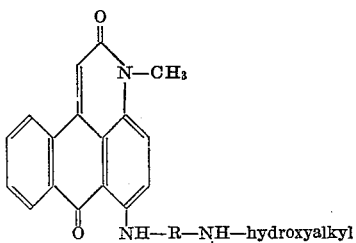

where R is a divalent alkyl group containing from 2 to 5 carbon atoms and said hydroxyalkyl is a hydroxyalkyl radical containing from two to eight carbon atoms.

7. A hydrochloric acid salt of a compound having the formula,

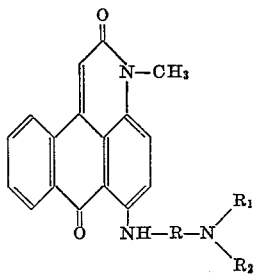

where R, R₁ and R₂ are lower alkyl.

8. An acid addition salt of 6-(γ-diethylaminopropylamino) - 3 - methyl - 7H-dibenz[f,ij]isoquinoline-2,7(3H)-dione.

9. An acid addition salt of 6-[ε-(1-piperidino)amylamino] - 3-methyl - 7H-dibenz[f,ij]isoquinoline - 2,7(3H)-dione.

10. An acid addition salt of 6-(γ-isopropylaminopropylamino) - 3-methyl - 7H-dibenz[f,ij]isoquinoline-2,7(3H)-dione.

11. Process of producing a 3-methyl-7H dibenz-[f,ij]-isoquinoline-2,7(3H)-dione which comprises condensing in the presence of a copper condensation catalyst at a temperature in excess of 75° C., a 6-halo-3-methyl-7H-dibenz-[f,ij]isoquinoline-2,7(3H)-dione having the formula,

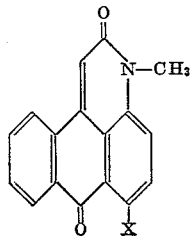

with an alkylaminoalkylamine having the formula,

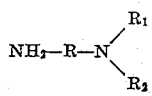

where X is a halogen atom, R is a divalent alkyl group containing from 2 to 5 carbon atoms, $R_1$ is a member of the group consisting of hydrogen and alkyl and hydroxyalkyl radicals containing not more than two carbon atoms and $R_2$ is a member of the group consisting of alkyl and hydroxyalkyl radicals containing from two to eight carbon atoms and further members wherein $R_1$ and $R_2$ taken together with —N< represent a radical of the class consisting of piperidino, morpholino and pyrrolidino radicals.

References Cited in the file of this patent

UNITED STATES PATENTS 2,579,185    Granatek _____ Dec. 18, 1951

FOREIGN PATENTS 486 of 1908    Great Britain _____ Nov. 12, 1908